United States Patent
Santo et al.

(10) Patent No.: US 9,417,426 B2
(45) Date of Patent: Aug. 16, 2016

(54) LENS BARREL

(71) Applicant: PANASONIC CORPORATION, Osaka (JP)

(72) Inventors: Takeo Santo, Osaka (JP); Masayuki Akieda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 4 days.

(21) Appl. No.: 14/501,943

(22) Filed: Sep. 30, 2014

(65) Prior Publication Data

US 2015/0103420 A1  Apr. 16, 2015

(30) Foreign Application Priority Data

Oct. 15, 2013  (JP) ................... 2013-214501
Jul. 14, 2014  (JP) ................... 2014-143817

(51) Int. Cl.
G02B 7/02    (2006.01)
G02B 7/10    (2006.01)
G03B 17/14   (2006.01)

(52) U.S. Cl.
CPC .. *G02B 7/10* (2013.01); *G03B 17/14* (2013.01)

(58) Field of Classification Search
CPC .................. G02B 7/10; G03B 17/14
USPC ......................... 359/699, 701, 817
See application file for complete search history.

(56) References Cited

U.S. PATENT DOCUMENTS 3,841,735 A * 10/1974 Katagiri ............. G02B 15/22
                                              359/699
2008/0170303 A1* 7/2008 Bieg ................... G02B 7/005
                                              359/811

FOREIGN PATENT DOCUMENTS

JP          07-043593 A    2/1995

* cited by examiner

*Primary Examiner* — Scott J Sugarman
*Assistant Examiner* — Vipin Patel
(74) *Attorney, Agent, or Firm* — McDermott Will & Emery LLP

(57) ABSTRACT

A lens barrel includes: a fixed frame; a zoom ring rotatably held around an outer periphery of the fixed frame; a contact member; and a biasing member. The zoom ring has a first sliding surface to a fourth sliding surface. When the contact member moves on the first sliding surface, a first load is applied to the biasing member; when the contact member moves on the second sliding surface, a second load greater than the first load is applied to the biasing member; and when the contact member moves on the third sliding surface, a load which varies in a range from the first load to the second load is applied to the biasing member.

9 Claims, 12 Drawing Sheets

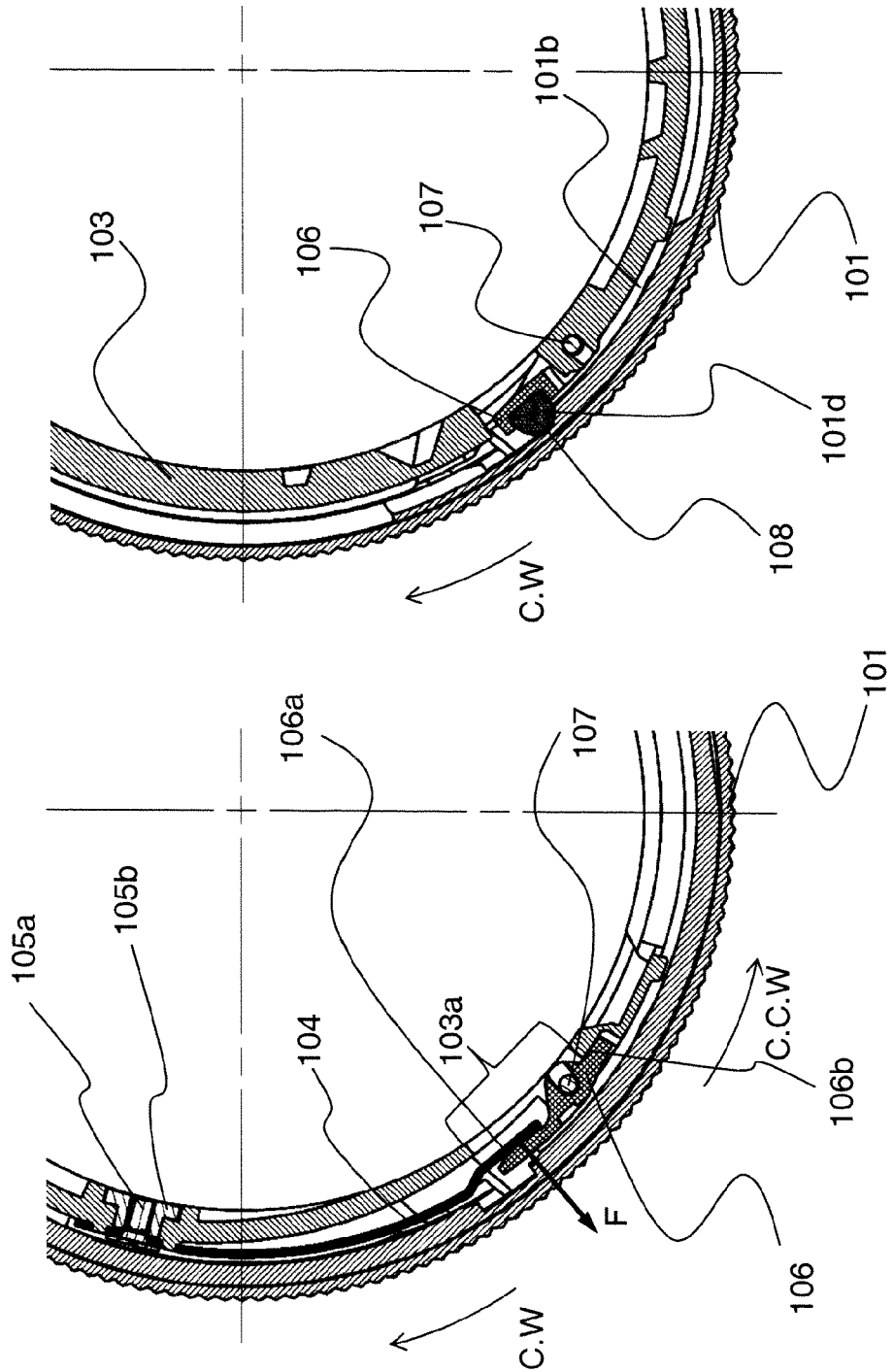

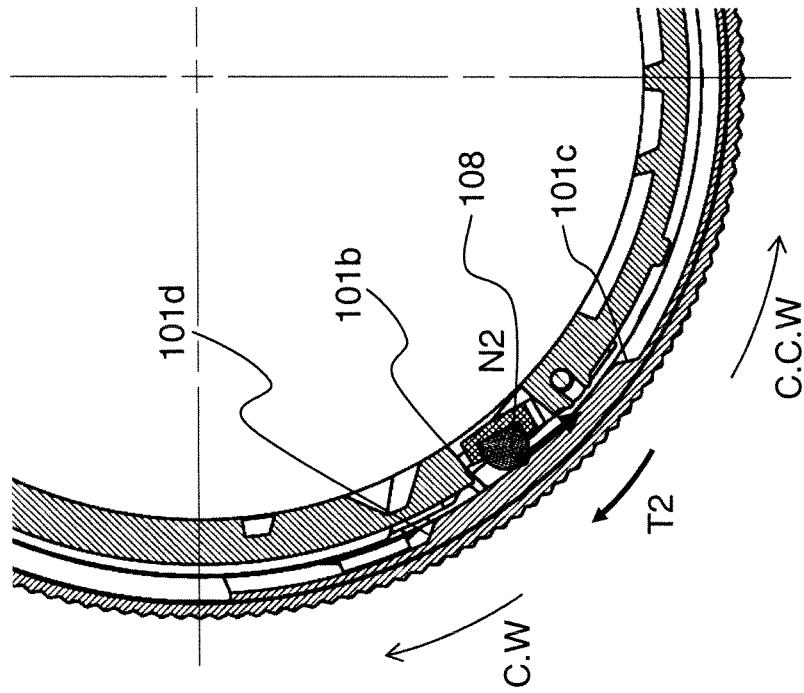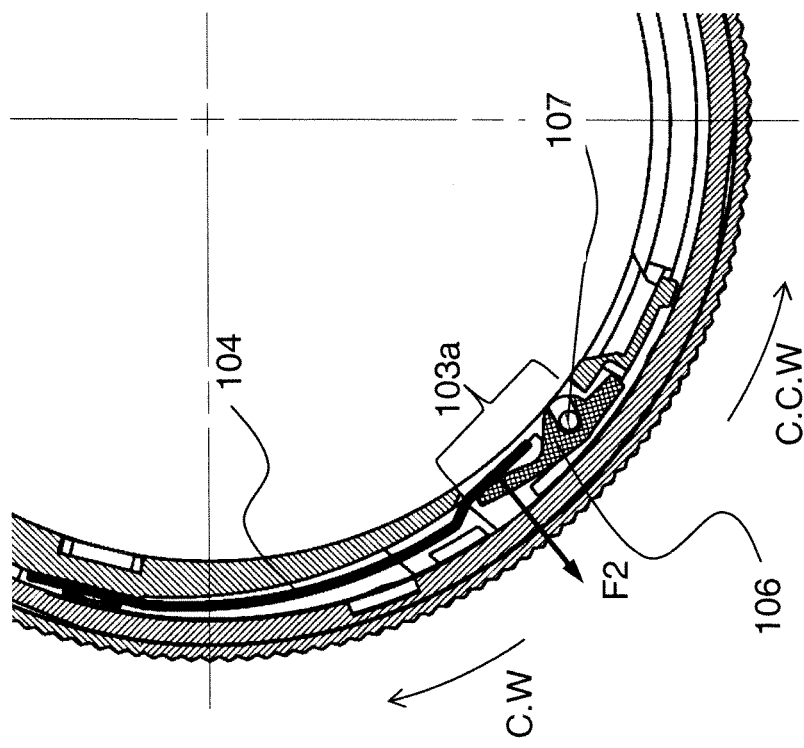

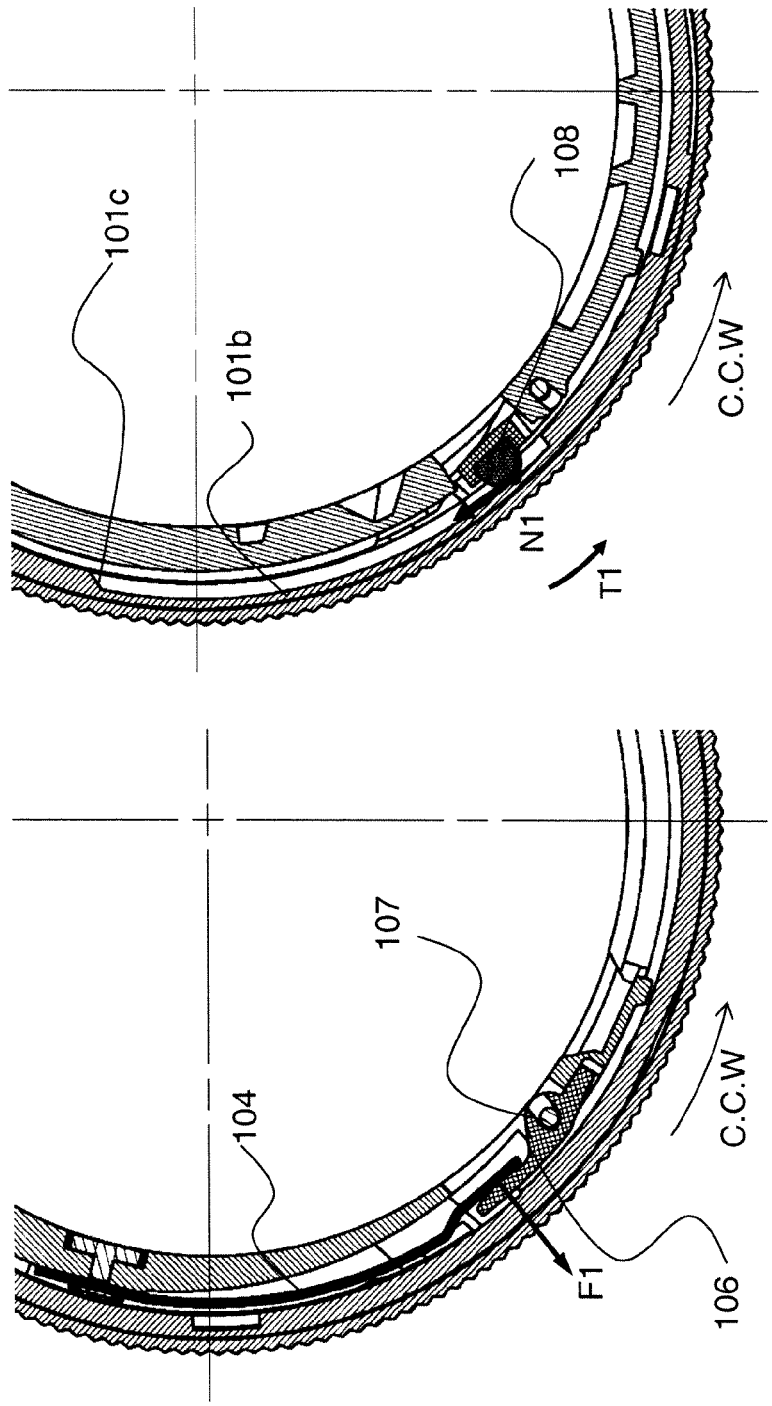

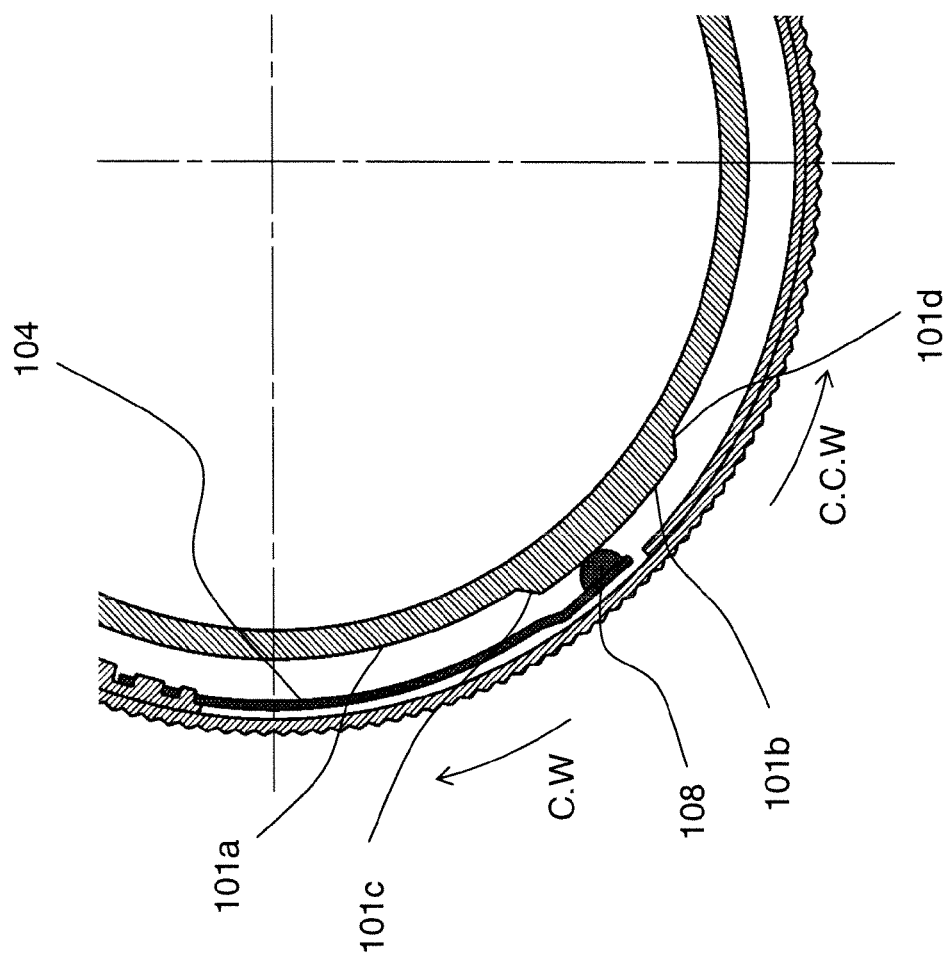

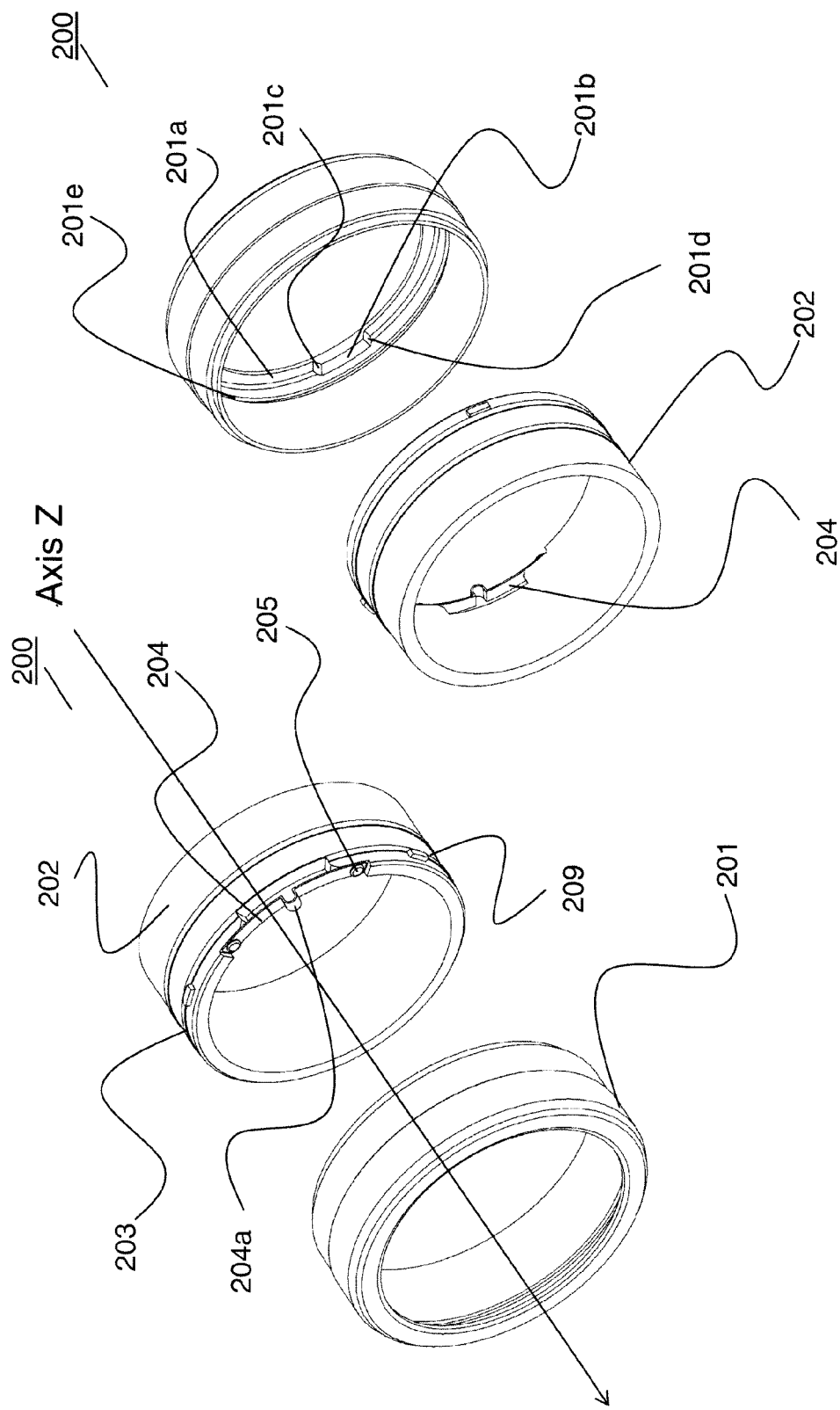

Collapsed state

Switching state

Wide-angle state

Telephoto state

LENS BARREL

RELATED APPLICATIONS

This application is the claims the benefit of Japanese Application No. 2013-214501, filed on Oct. 15, 2013, and Japanese Application No. 2014-143817, filed on Jul. 14, 2014, the disclosures of which are incorporated by reference herein.

BACKGROUND

1. Technical Field

The present disclosure relates to lens barrels including interchangeable lenses.

2. Description of the Related Art

PTL 1 discloses a driving device for zooming by a manual operation. In the disclosed driving device, a lens moving unit extends a zoom lens from a housed position to a photographing region (photographing-possible position) in conjunction with a manual operation. In addition, the lens moving unit causes the zoom lens extended at the photographing-possible position to perform a zooming operation in accordance with a manual zoom operation. Further, that lens moving unit moves the zoom lens from the photographing-possible position to the housed position in conjunction with a manual collapsing operation of the lens. With those functions, the zoom lens can be moved between the photographing-possible position and a predetermined housed position by a manual operation. In addition, a photographing-ready state and a not-photographing state can be distinguished, based on feel on hand.

CITATION LIST

Patent Literature

PTL 1: Unexamined Japanese Patent Publication No. H07-43593

SUMMARY

A lens barrel of the present disclosure provides a lens barrel which realizes improvement of operability and downsizing.

A lens barrel of the present disclosure includes: a fixed frame which holds a casing; a ring rotatably held around an outer periphery of the fixed frame; an action part provided between the fixed frame and the ring, along the outer periphery of the fixed frame; and a biasing member provided between the fixed frame and the ring, along the outer periphery of the fixed frame. The ring includes: a first action surface to be used at a time of photographing; a second action surface to be used when the casing held by the fixed frame is collapsed into the fixed frame; and a third action surface formed between the first action surface and the second action surface. The action part moves on the first action surface, the second action surface, and the third action surface; the biasing member biases the action part toward the outer periphery of the fixed frame; when the action part moves on the first action surface, a first load is applied to the biasing member; when the action part moves on the second action surface, a second load greater than the first load is applied to the biasing member; and when the action part moves on the third action surface, a load which varies from the first load to the second load is applied to the biasing member.

Alternatively, a lens barrel of the present disclosure includes: a fixed frame which holds a casing; a ring rotatably held around an outer periphery of the fixed frame; an action part provided between the fixed frame and the ring, along the outer periphery of the fixed frame; and a biasing member provided between the fixed frame and the ring, along the outer periphery of the fixed frame. The ring includes: a first action surface to be used at a time of photographing; a second action surface to be used when the casing held by the fixed frame is collapsed into the fixed frame; and a third action surface formed between the first action surface and the second action surface. The action part moves on the first action surface, the second action surface, and the third action surface; the biasing member biases the action part toward the outer periphery of the fixed frame; the first action surface is located closer to an outer periphery of the ring than the second action surface is; and the third action surface connects an end of the first action surface and an end of the second action surface.

The lens barrel of the present disclosure realizes improvement of operability and downsizing.

BRIEF DESCRIPTION OF DRAWINGS

FIGS. 4A and 4B are partial cross-sectional views of the lens barrel of the first exemplary embodiment in a collapsed state;

FIGS. 5A and 5B are partial cross-sectional views of the lens barrel of the first exemplary embodiment in a switching state;

FIGS. 7A and 7B are partial cross-sectional views of the lens barrel of the first exemplary embodiment in a telephoto state;

FIG. 8 is a schematic diagram of a partial cross section of a lens barrel of a modified example of the first exemplary embodiment;

FIGS. 9A and 9B are perspective views of a lens barrel of a second exemplary embodiment;

DETAILED DESCRIPTION OF THE PREFERRED EMBODIMENTS

With reference to the drawings if necessary, exemplary embodiments will be described in detail below. However, description is not made in too much detail in some cases. For example, an already well-known matter may not be described in detail, and substantially the same configuration may not be described again. This is to avoid the following description being unnecessarily redundant and to help a person skilled in the art to easily understand.

Note that the inventors provide the attached drawings and the following description to help a person skilled in the art to sufficiently understand the present disclosure, and the inventors do not intend to limit the subject matter described in the claims by the drawings or the description.

First Exemplary Embodiment

The present exemplary embodiment will be described with reference to FIGS. 1 to 8.

In the present exemplary embodiment, description will be made by using an interchangeable lens which is detachable to a camera main body as an example of a lens barrel.

[1. Lens Barrel Configuration of Interchangeable Lens (FIG. 1 to FIG. 3)]

Figure 1:
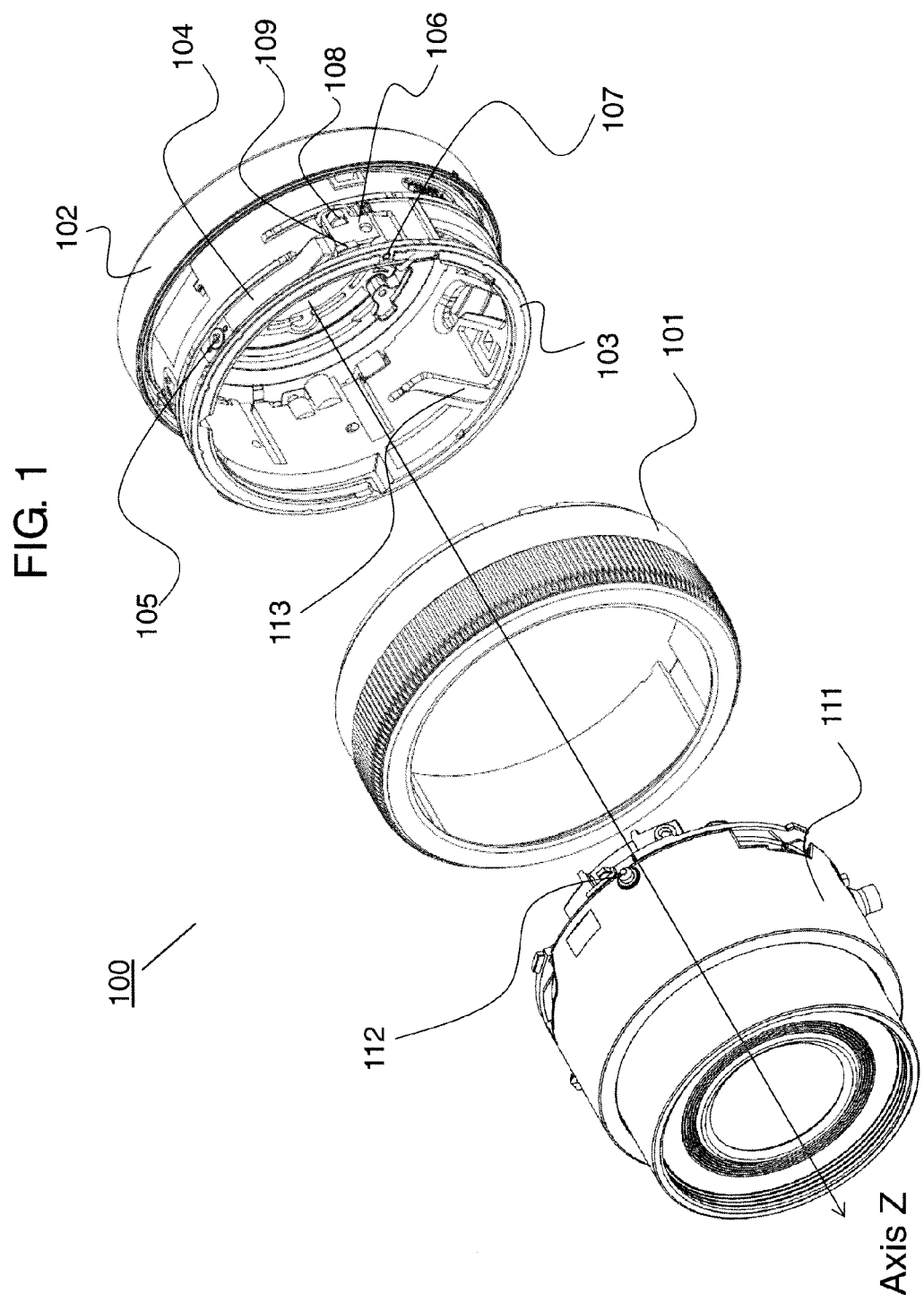
FIG. 1 is a perspective view of a lens barrel of a first exemplary embodiment.

FIG. 1 is an exploded perspective view of lens barrel 100 of the interchangeable lens.

Figure 2:
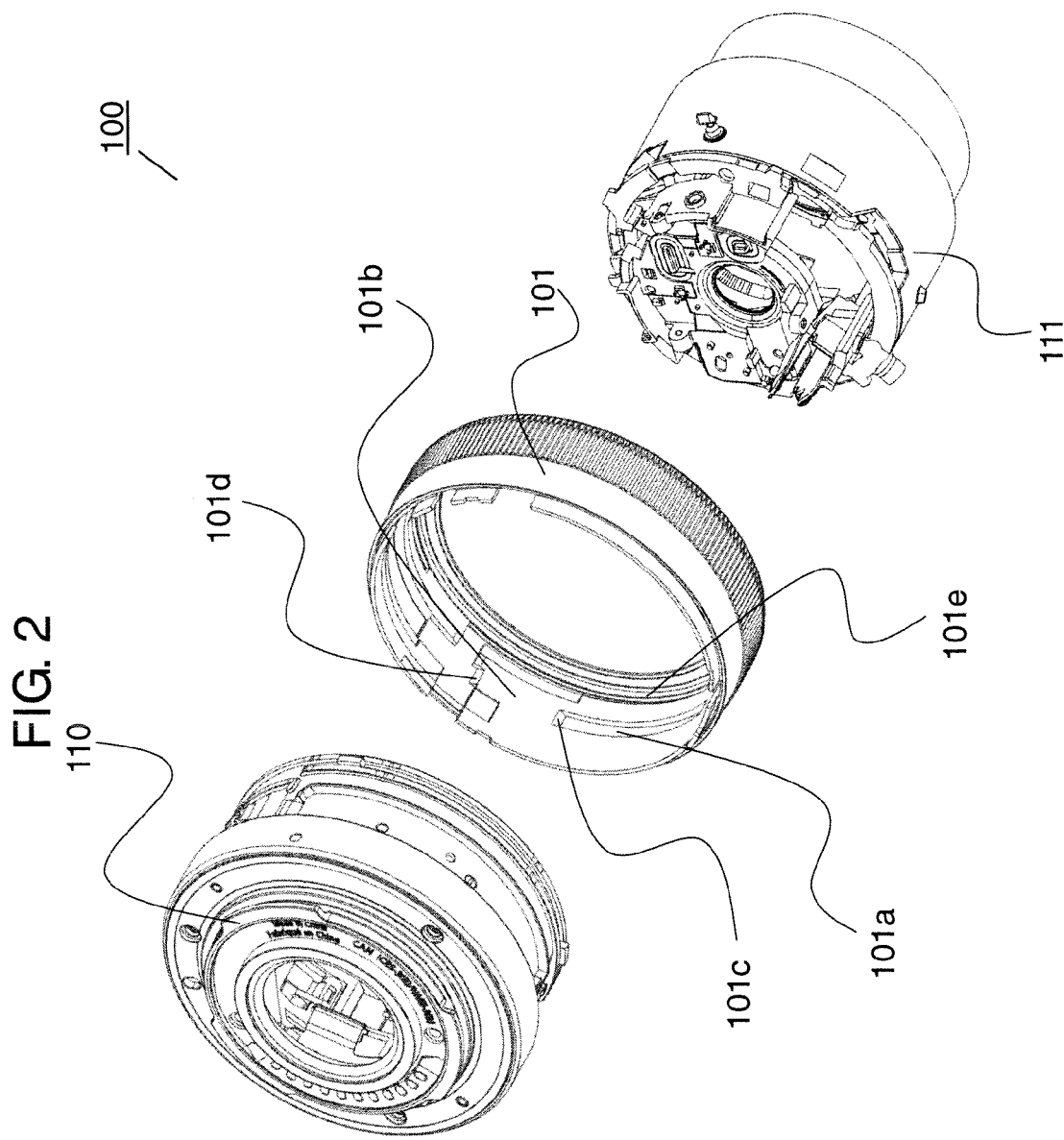
FIG. 2 is a perspective view of the lens barrel of the first exemplary embodiment.

FIG. 2 is an exploded perspective view of lens barrel 100 when viewed from a different angle.

Lens barrel 100 of the present exemplary embodiment is connected to a camera body through mount 110 shown in FIG. 2.

Lens barrel 100 has zoom ring 101 and fixed unit 102.

Fixed unit 102 has fixed frame 103, biasing member 104, connection member 105, lever member 106, lever rotary shaft 107, contact member 108 (action part), and mount 110.

As shown in FIG. 2, zoom ring 101 includes first sliding surface 101a (an example of a first action surface), second sliding surface 101b (an example of a second action surface), third sliding surface 101c (an example of a third action surface), fourth sliding surface 101d, and guide groove 101e.

The components will be specifically described with reference to the drawings below.

Casing 111 has cam follower 112, and fixed frame 103 has cam groove 113. Cam follower 112 is engaged with cam groove 113. With this configuration, casing 111 is rotatably held by fixed frame 103.

Casing 111 moves in a direction of the rotation axis Z with the rotation of zoom ring 101.

Zoom ring 101 is disposed on an outer periphery of fixed frame 103. Zoom ring 101 is rotatable relative to fixed frame 103. In addition, a rotation axis Z of zoom ring 101 shown in FIG. 1 coincides with an optical axis of the interchangeable lens.

Guide groove 101e provided on an inner periphery side of zoom ring 101, which is shown in FIG. 2, is fitted to guide rib 109 provided on an outer periphery side of fixed frame 103. Guide groove 101e also controls zoom ring 101 so that zoom ring 101 does not move in the direction of the rotation axis Z with respect to fixed frame 103.

On the inner periphery side of zoom ring 101, there are formed first sliding surface 101a and second sliding surface 101b, each of which has different radius from the rotation axis Z. On the inner periphery side of zoom ring 101, third sliding surface 101c is formed between first sliding surface 101a and second sliding surface 101b. In addition, on an end of second sliding surface 101b which is on the opposite side to third sliding surface 101c, fourth sliding surface 101d is formed. Second sliding surface 101b is made to have a smaller radius from rotation axis Z than first sliding surface 101a has. That is to say, first sliding surface 101a is close to an outer periphery of zoom ring 101, and second sliding surface 101b is far from the outer periphery of zoom ring 101. In addition, third sliding surface 101c is made to have a radius which continuously varies from a radius on first sliding surface 101a from the rotation axis Z to a radius on second sliding surface 101b from the rotation axis Z. In other words, third sliding surface 101c is disposed between second sliding surface 101b and first sliding surface 101a and connects second sliding surface 101b and first sliding surface 101a. Contact member 108 is configured to move on first sliding surface 101a, second sliding surface 101b, third sliding surface 101c, and fourth sliding surface 101d.

Fixed frame 103 holds biasing member 104, connection member 105, lever member 106, lever rotary shaft 107, and contact member 108.

Biasing member 104 is a member fixed on fixed frame 103 by connection member 105. Biasing member 104 is fixed along the outer periphery of fixed frame 103. Biasing member 104 biases lever member 106 toward the outer periphery of fixed frame 103.

Connection member 105 is a member used to fix biasing member 104 on fixed frame 103.

Lever member 106 is a member biased toward the outer periphery of fixed frame 103 by biasing member 104, and rotates with lever rotary shaft 107 as a center of rotation. Lever member 106 has contact member 108. Lever member 106 (action part) has contact member 108 (first area) which is in contact with first sliding surface 101a to fourth sliding surface 101d, and a second area which is biased by biasing member 104. When a user rotates zoom ring 101 around rotation axis Z, contact member 108 moves on, in order, fourth sliding surface 101d, second sliding surface 101b, third sliding surface 101c, and first sliding surface 101a of zoom ring 101. Contact member 108 is biased by biasing member 104 toward the outer periphery of fixed frame 103, but opening 103a limits the position at which contact member 108 is biased. In other words, contact member 108 is configured so that even when contact member 108 is biased by biasing member 104, contact member 108 does not pop out to the outer periphery of fixed frame 103.

Figure 3:
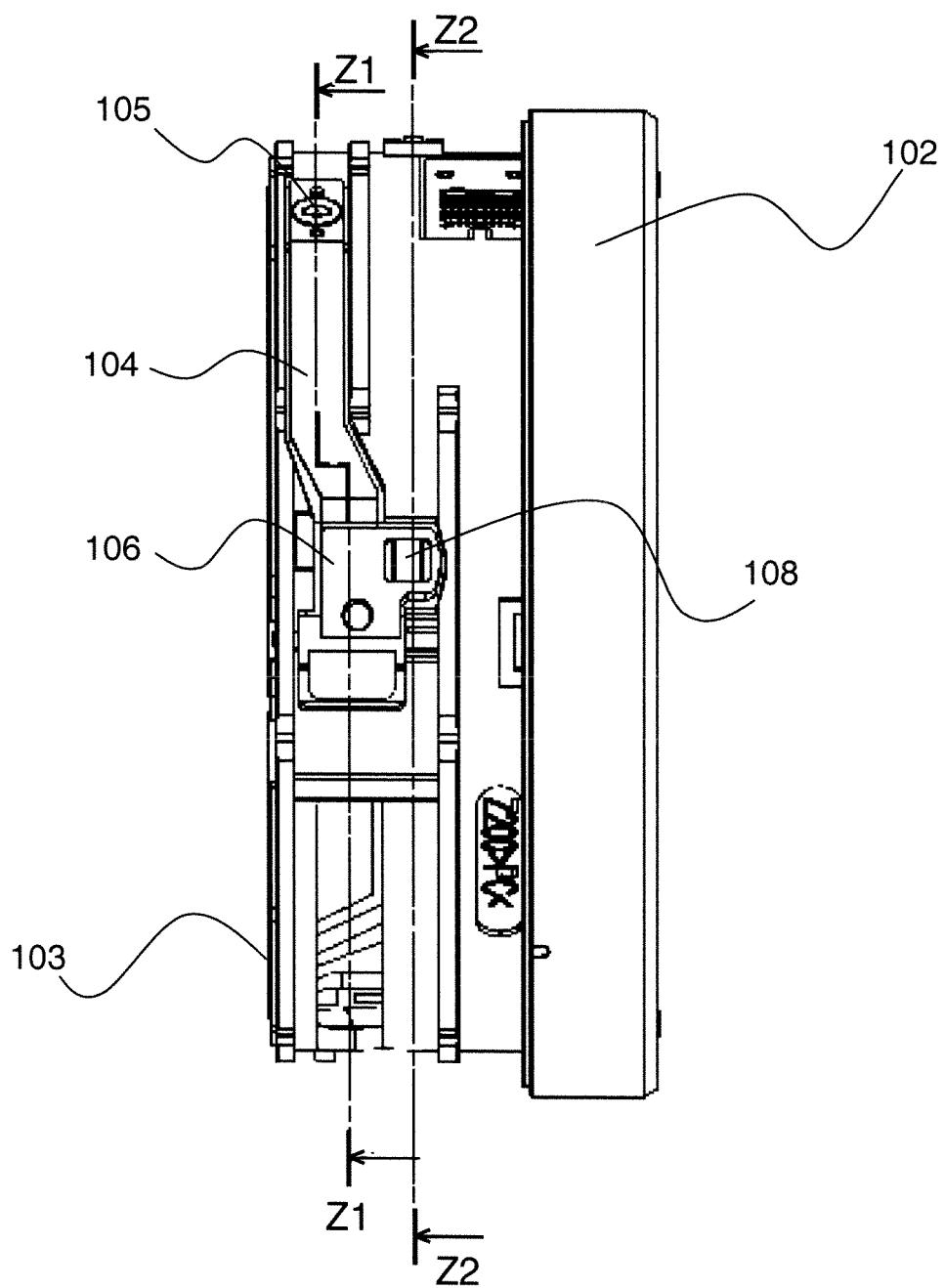
FIG. 3 is a side view of a fixed unit of the first exemplary embodiment.

FIG. 3 shows a side view of the fixed unit.

FIG. 4A shows a partial cross-sectional view taken along position Z1-Z1 in the direction of the rotation axis Z of FIG. 3.

FIG. 4B shows a partial cross-sectional view taken along position Z2-Z2 in the direction of the rotation axis Z, and illustrates an arrangement configuration of lever member 106 and biasing member 104. FIG. 4A and FIG. 4B show a collapsed state, which is a standby state of the interchangeable lens to be described later. In this state, contact member 108 is in contact with fourth sliding surface 101d.

Lever rotary shaft 107 is held on fixed frame 103 to be parallel to rotation axis Z. Lever member 106 is held on fixed frame to be rotatable around lever rotary shaft 107. On the surface, of lever member 106, directed to the outer periphery side of fixed frame 103, the contact member 108 is held. Contact member 108 is an arc-shaped member having an arc shape on the Z2-Z2 plane, and has a predetermined width in the direction of the rotation axis Z. Contact member 108 is a member formed by cutting a pin made of, for example, SUS (Steel Use Stainless), and is held on lever member 106 by press-insertion or adhesion. On a surface of lever member 106 which is directed to an inner periphery side of fixed frame 103, there is provided curved action surface 106a; and on a side of lever member 106 opposite with respect to lever rotary shaft 107, there is provided rotation regulation surface 106b.

Biasing member 104 is, for example, an arc-shaped leaf spring. Biasing member 104 is disposed along the direction of the outer periphery of fixed frame 103. Biasing member 104 is held on fixed frame 103, being clamped by connection member 105a such as a bolt member and connection member 105b such as a nut member at an end in the circumferential direction. Since biasing member 104 biases lever member 106, a load due to biasing is applied to a part connected with fixed frame 103. For this reason, biasing member 104 is not connected directly to fixed frame 103, but is connected through connection member 105a as a bolt member and connection member 105b as a nut member. With this configuration, biasing member 104 and fixed frame 103 are connected more strongly.

The end of biasing member 104 opposite to the fixed end is inserted in opening 103a provided in fixed frame 103, and is in contact with curved action surface 106a of lever member 106 to bias in the direction of arrow F. In other words, biasing member 104 provides force to rotate lever member 106 around lever rotary shaft 107.

An arrangement is made such that a central position of rotation of lever rotary shaft 107 and a position at which biasing member 104 applies a biasing force F to lever member 106 are located at positions to have approximately the same radius from rotation axis Z of zoom ring 101.

In the above description, the described configuration has biasing member 104 made up of a leaf spring; however, any member can be used if the member can bias lever member 106. The biasing member can be for example, a compression coil spring, a torsion coil spring, and the like.

[2. Switching Torque (FIG. 4A to FIG. 7B)]

Next, an action of a switching torque and a configuration to generate the switching torque will be described.

FIG. 4A, FIG. 5A, FIG. 6A, and FIG. 7A are partial cross-sectional views of the lens barrel shown in FIG. 3 taken along line Z1-Z1. FIG. 4B, FIG. 5B, FIG. 6B, and FIG. 7B are partial cross-sectional views of the lens barrel shown in FIG. 3 taken along line Z2-Z2. As described above, FIGS. 4A and 4B illustrate the standby state, in which the interchangeable lens is not used. FIGS. 4A and 4B illustrate the collapsed state, in which a not shown lens frame provided on an inner peripheral side of lens barrel 100 is housed inside lens barrel 100.

FIGS. 5A and 5B are diagrams illustrating a state in which the interchangeable lens is changed from the standby state to a use state (wide-angle state).

Figure 6A:
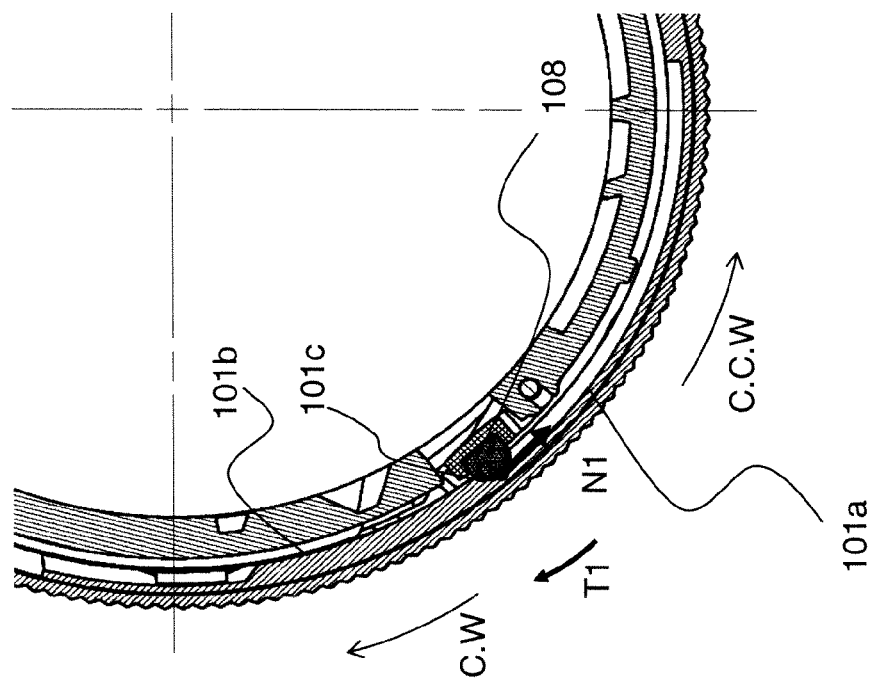
FIGS. 6A and 6B are partial cross-sectional views of the lens barrel of the first exemplary embodiment in a wide-angle state.
Figure 6B:
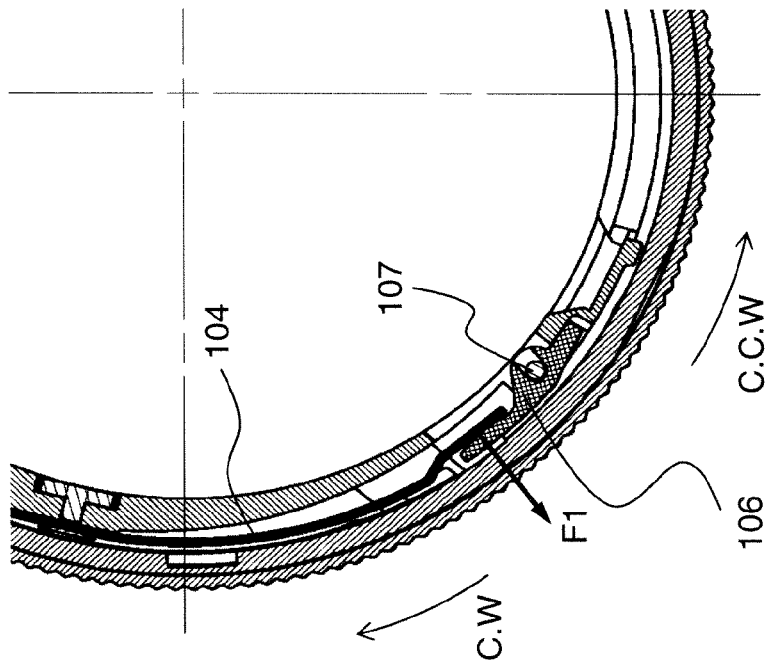

FIGS. 6A and 6B are diagrams illustrating the wide-angle state of the zoom lens, which is a wide angle side in the use state of the interchangeable lens. In FIGS. 6A and 6B, the lens frame not shown extends out of lens barrel 100 in the direction of the rotation axis Z.

FIGS. 7A and 7B are diagrams illustrating a telephoto state of the zoom lens, which is a telephoto side in the use state of the interchangeable lens.

Between the wide-angle state (wide-angle side) shown in FIGS. 6A and 6B and the telephoto state (telephoto side) shown in FIGS. 7A and 7B, the interchangeable lens is capable of photographing.

[Description on State Transition from Collapsed State to Use State]

When a user uses the interchangeable lens, the user rotates zoom ring 101 in a C.W direction (clockwise direction: a clockwise direction seen from an object side in an optical axis direction) to switch from the collapsed state to the wide-angle state before photographing. Then if the user wants to change the focal length for photographing, the user rotates zoom ring 101 between the wide-angle state (wide-angle side) and the telephoto state (telephoto side) to set an arbitrary focal length before photographing. When switching back from the state of photographing to the collapsed state (standby state), the user rotates zoom ring 101 in a C.C.W direction (counterclockwise direction: a counterclockwise direction viewed from the object side in the optical axis direction).

In the collapsed state (standby state) of FIGS. 4A and 4B, contact member 108 is in contact with fourth sliding surface 101d. In this state, lever member 106 is received a rotative force around lever rotary shaft 107 from the biasing force F of biasing member 104, and rotation regulation surface 106b is in contact with fixed frame 103. Since zoom ring 101 is in contact with a mechanical end of the fixed frame (not shown), zoom ring 101 cannot rotate in the C.C.W direction in the collapsed state.

When the user rotates zoom ring 101 in the C.W direction, contact member 108 slides on fourth sliding surface 101d and comes in contact with second sliding surface 101b as shown in FIG. 5B. When contact member 108 moves from fourth sliding surface 101d to second sliding surface 101b, contact member 108 rotates together with lever member 106 around lever rotary shaft 107. As lever member 106 rotates, biasing member 104 in contact with lever member 106 deforms in the direction opposite to the biasing force F (toward a center of the lens barrel). Thus, in the switching state, the biasing force of the biasing member 104 becomes to be F2, which is greater than F. In order to rotate zoom ring 101, a rotation torque (switching torque) greater than the increasing biasing force of biasing member 104 is required.

Here, since lever member 106 is in contact with biasing member 104 on curved action surface 106a, even a rotational direction of lever member 106 does not coincide with a direction of deformation of biasing member 104, a contact part between lever member 106 and biasing member 104 moves smoothly on curved action surface 106a, thereby preventing an operation torque from fluctuating.

In the switching state shown in FIGS. 5A and 5B, contact member 108 is in contact with zoom ring 101 on second sliding surface 101b. Since second sliding surface 101b has a constant radius, the lever member does not rotate in the switching state. The rotation torque required for operating zoom ring 101 is a rotation torque T2 including a friction force N2, caused by the biasing force F2, in the rotational direction. Biasing member 104 deforms and lever member 106 deforms or rotates in such a range that biasing member 104 or lever member 106 does not protrude inside an inner periphery of fixed frame 103.

When the user rotates zoom ring further in the C.W direction and contact member 108 has reached the use state (wide-angle state) shown in FIGS. 6A and 6B, contact member 108 and lever member 106 rotate to the position at which contact member 108 comes in contact with first sliding surface 101a because biasing member 104 biases lever member 106. In this state, the biasing force of biasing member 104 is the biasing force F1, which is smaller than the biasing force F2.

In a range from wide-angle state (FIGS. 6A and 6B) to telephoto state (FIGS. 7A and 7B), which is the use state, the rotation torque required for operating zoom ring 101 is a rotation torque T1 including the friction force N1, which is caused by the biasing force F1 and is in the rotational direction. Rotation torque T1 in the use state is smaller than the rotation torque T2 in the switching state.

In the telephoto state (FIGS. 7A and 7B), since zoom ring 101 is in contact with the mechanical end of the fixed frame not shown, zoom ring 101 cannot rotate in the C.W direction.

[Description on State Transition from Use State to Collapsed State]

The user rotates zoom ring 101 in the range from the wide-angle state to the telephoto state, and focuses and photographs. After the photographing, when the interchangeable lens is switched back to the collapsed state, which is the standby state, the flow is reversed to the flow described above.

When the user rotates zoom ring 101 in the C.C.W direction, contact member 108 comes in contact with third sliding surface 101c while being in the wide-angle state (FIGS. 6A and 6B). In this state, when the user rotates zoom ring 101 further in the C.C.W direction, lever member 106 rotates around lever rotary shaft 107 to be the switching state (FIGS.

5A and 5B). As lever member 106 rotates, biasing member 104 in contact with lever member 106 deforms in the direction opposite to a biasing direction of the biasing force F. In this state, the biasing force of biasing member 104 is the biasing force F2, which is greater than the biasing force F; thus, in order to rotate zoom ring 101, a rotation torque (switching torque) greater than the increasing biasing force of biasing member 104 is required.

As described above, at a stage where the user changes the state from the use state or the standby state to the switching state, a large switching torque is required to rotate zoom ring 101. In other words, on a border between the use state or the standby state and the switching state, a rotary operation force of zoom ring 101 changes. When the user rotates zoom ring 101, the user can recognize by the change in a feel of operation that the state is in the switching state.

In the present exemplary embodiment, it is not necessary to perform an operation such as pressing a switch in order to distinguish the use state from the switching state or to distinguish the standby state from the switching state. Thus, there is no need for an additional switch or the like, and operability can be improved without increase in size of the interchangeable lens.

In addition, the biasing member 104 is an arc-shaped leaf spring and disposed along the outer periphery of fixed frame 103, and an end of biasing member 104 is inserted in opening 103a provided in fixed frame 103. Further, the central position of rotation of lever rotary shaft 107 and a point at which biasing member 104 applies the biasing force F to lever member 106 are located at positions to have approximately the same radius from the rotation axis Z of zoom ring 101. Thus, even when lever member 106 rotates to be in such a state that the switching torque actions, lever member 106 does not protrude inside the inner periphery of fixed frame 103. In addition, the surface (curved action surface 106a) on which lever member 106 is in contact with biasing member 104 and contact member 108 which is in contact with the sliding surface of zoom ring 101 are located at different positions in the direction of the rotation axis Z. In other words, the area in which biasing member 104 is disposed and the area in which contact member 108 is disposed are different areas. Thus, the thickness of lever member 106 in the radius direction can be made thin.

As described above, the components for generating the switching torque are disposed between an inner periphery surface of fixed frame 103 and an outer periphery surface of zoom ring 101; thus, a small-sized lens barrel can be realized. In other words, there can be realized a small-sized lens barrel which has a collapsed state and provides a switching torque and which has the same outer diameter size as an outer casing of a lens barrel which does not have a collapsed state and thus does not need a switching torque.

Note that, by setting an inclination angle of third sliding surface 101c of zoom ring 101, it is possible to set any magnitude of the switching torque from the wide-angle state to the switching state. Further, by setting an inclination angle of fourth sliding surface 101d, it is possible to set any magnitude of the switching torque form the collapsed state to the switching state.

In addition, contact member 108 has a width in the direction of the rotation axis Z; thus, contact member 108 is in line-contact with first sliding surface 101a to fourth sliding surface 101d of zoom ring 101. Thus, even when operation is repeated, the sliding surface of zoom ring 101 does not deform due to a contact pressure, whereby a stable switching torque and a stable rotary operation torque can be obtained.

Further, the width of contact member 108 in the direction of the rotation axis Z may have a gently curved surface.

In the present disclosure, a length of second sliding surface 101b in a direction (hereinafter, referred to as a "first direction") along the outer periphery of zoom ring 101 is longer than the length of contact member 108 in the first direction.

The rotation torque from the wide-angle state to the telephoto state, which are the use state, also can be adjusted. For example, contact member 108 does not need to be in contact with first sliding surface 101a of zoom ring 101. In this case, lever member 106 is in contact with fixed frame 103 on rotation regulation surface 106b, and zoom ring 101 and contact member 108 do not receive a friction force in the rotational direction due to the biasing force F of biasing member 104; thus, the operation can be performed with a small rotation torque.

Alternatively, contact member 108 may be integrally configured together with lever member 106. The contact member is integrally configured with the lever member by using the same material, and thus a number of components can be reduced.

Further, a configuration may be made such that lever member 106, contact member 108, and lever rotary shaft 107 are not provided, and on the surface of biasing member 104 which is in contact with lever member 106, a curved-surface protrusion is formed to directly bias the sliding surface of zoom ring 101. In this case, biasing member 104 needs to have a component size with high precision in order to obtain a stable switching torque; however, a number of components can be reduced.

Modified Example of First Exemplary Embodiment

Next, a modified example of the first exemplary embodiment will be described with reference to FIG. 8. Note that, with respect to FIG. 8, the same components as in the first exemplary embodiment are assigned the same reference numerals, and are not described in detail. FIG. 8 is a schematic diagram of the modified example of the first exemplary embodiment, and the lever member, the lever rotary shaft, and the like are not illustrated. In FIG. 8, biasing member 104 and contact member 108 are integrally formed; however, this configuration is not restrictive.

In the first exemplary embodiment described with reference to FIG. 1 to FIG. 7B, biasing member 104 is held on fixed frame 103, and first sliding surface 101a to fourth sliding surface 101d are disposed on rotatable zoom ring 101. On the other hand, in the modified example of the first exemplary embodiment shown in FIG. 8, biasing member 104 is held on the rotatable zoom ring, and first sliding surface 101a to fourth sliding surface 101d are disposed on fixed frame 103.

The modified example of the first exemplary embodiment also can provide the same advantageous effect as the first exemplary embodiment.

[Conclusion]

Lens barrel 100 of the present exemplary embodiment include: fixed frame 103 which holds casing 111; zoom ring 101 rotatably held around the outer periphery of fixed frame 103; contact member 108 provided between fixed frame 103 and zoom ring 101, along the outer periphery of fixed frame 103; and biasing member 104 provided between fixed frame 103 and zoom ring 101, along the outer periphery of fixed frame 103. Zoom ring 101 includes first sliding surface 101a to be used at the time of photographing; second sliding surface 101b to be used when casing 111 held by fixed frame 103 is collapsed into fixed frame 103; and third sliding surface 101c formed between first sliding surface 101a and second sliding surface 101b. Contact member 108 moves on first sliding surface 101a, second sliding surface 101b, and third sliding surface 101c; biasing member 104 biases contact member 108 toward the outer periphery of fixed frame 103; when contact member 108 moves on first sliding surface 101a, the first load is applied to biasing member 104; when contact member 108 moves on second sliding surface 101b, the second load greater than the first load is applied to biasing member 104; and when contact member 108 moves on third sliding surface 101c, the load which varies from the first load to the second load is applied to biasing member 104.

Further, lens barrel 100 of the present exemplary embodiment includes: fixed frame 103 which holds casing 111; zoom ring 101 rotatably held around the outer periphery of fixed frame 103; contact member 108 provided between fixed frame 103 and zoom ring 101, along the outer periphery of fixed frame 103; and biasing member 104 provided between fixed frame 103 and zoom ring 101, along the outer periphery of fixed frame 103. Zoom ring 101 includes: first sliding surface 101a to be used at the time of photographing; second sliding surface 101b to be used when casing 111 held by fixed frame 103 is collapsed into fixed frame 103; and third sliding surface 101c formed between first sliding surface 101a and second sliding surface 101b. Contact member 108 moves on first sliding surface 101a, second sliding surface 101b, and third sliding surface 101c; biasing member 104 biases contact member 108 toward the outer periphery of fixed frame 103; first sliding surface 101a is closer to the outer periphery of zoom ring 101 than second sliding surface 101b is; and third sliding surface 101c connects an end of first sliding surface 101a and an end of second sliding surface 101b.

Contact member 108 has a semi-cylindrical contact member which is in line-contact with second sliding surface 101b and third sliding surface 101c.

Further, a length of second sliding surface 101b in a first direction along the outer periphery of zoom ring 101 is longer than a length of contact member 108 in the first direction.

Further, contact member 108, which moves on first sliding surface 101a, second sliding surface 101b, and third sliding surface 101c, is disposed in a first area, and biasing member 104 is disposed in a second area which is different from the first area.

The above exemplary embodiment has been described as an example of a technology disclosed in the present application. However, the technology according to the present disclosure is not limited to the above exemplary embodiment, and can be applied to exemplary embodiments which include modification, replacement, addition, and removal as necessary.

Second Exemplary Embodiment

Next, a second exemplary embodiment will be described as an example with reference to FIG. 9A to FIG. 11D. Note that, the parts having the same components as in the first exemplary embodiment are not described.

FIG. 9A is an exploded perspective view of lens barrel 200 of an interchangeable lens of the second exemplary embodiment. FIG. 9B is an exploded perspective view of lens barrel 200 viewed from another angle.

Lens barrel 200 has zoom ring 201 and fixed unit 202. Fixed unit 202 has fixed frame 203, biasing member 204, and connection member 205. Zoom ring 201 is held on a front side end of fixed frame 203 by connection member 205. Zoom ring 201 is movable relative to fixed frame 203. A rotation axis Z of zoom ring 201 coincides with an optical axis of the interchangeable lens.

Guide groove 201e provided on the inner peripheral side of zoom ring 201 is fitted to guide rib 209 provided on an outer periphery side of fixed frame 203. Guide groove 201e controls zoom ring 201 so that zoom ring 201 does not move in the direction of the rotation axis Z with respect to fixed frame 203.

On a surface, of zoom ring 201, facing biasing member 204, there are formed first sliding surface 201a and second sliding surface 201b on different positions in the direction of the rotation axis Z. Further, between first sliding surface 201a and second sliding surface 201b, third sliding surface 201c is formed. Second sliding surface 201b is made to protrude to fixed frame 203 more than first sliding surface 201a. In addition, on an end of second sliding surface 201b which is on the opposite side to third sliding surface 201c, fourth sliding surface 201d is formed.

Around a center of biasing member 204, there is provided arc-shaped curved-surface projection 204a to be directed to zoom ring 201, and curved-surface projection 204a is in contact with the sliding surfaces of zoom ring 201. In other words, curved-surface projection 204a of biasing member 204 protrudes in the direction of the rotation axis Z.

Figure 10:
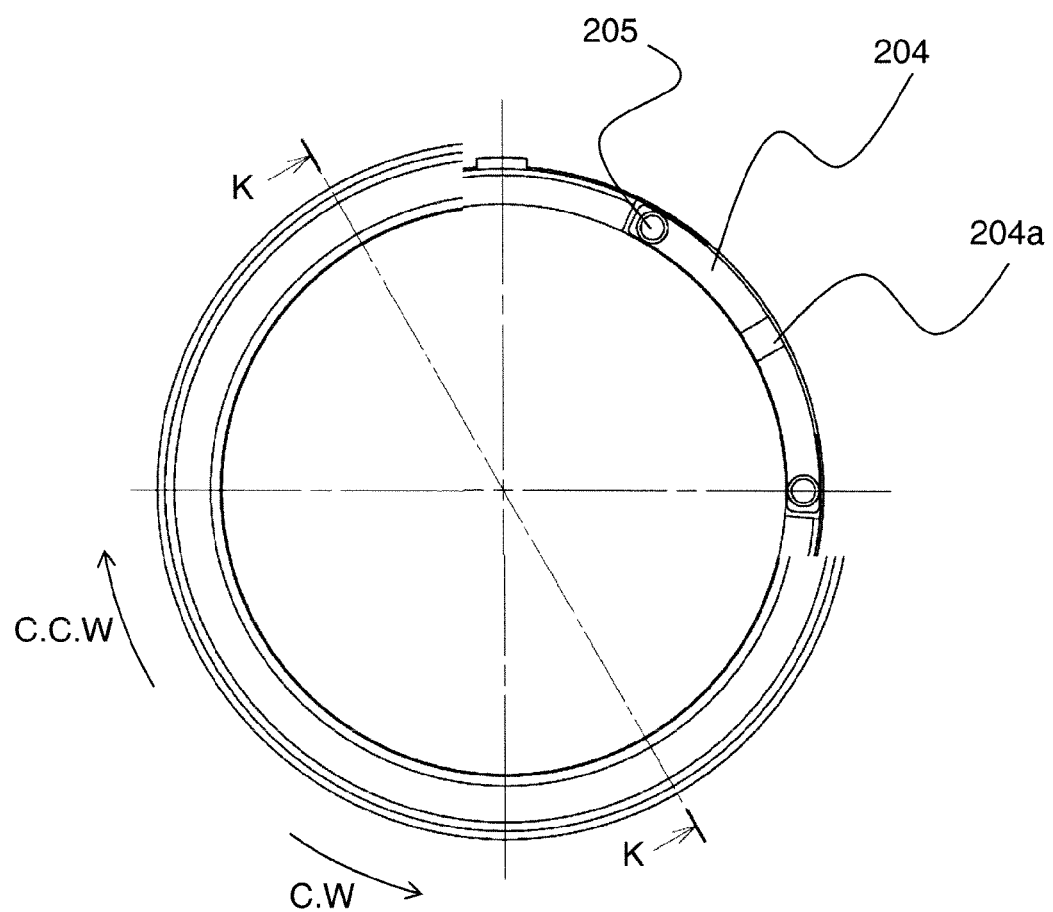
FIG. 10 is a front view of the lens barrel of the second exemplary embodiment.

FIG. 10 is a diagram of fixed unit 202 viewed from front side. As shown in FIG. 10, when viewed from front side, curved-surface projection 204a overlaps any one of first sliding surface 201a to fourth sliding surface 201d (not shown). FIG. 11A to FIG. 11D are diagrams showing fixed unit 202 on which zoom ring 201 is mounted. FIGS. 11A to 11D are cross-sectional views taken along line K-K of FIG. 10 crossing the rotation axis Z.

Figure 11A:
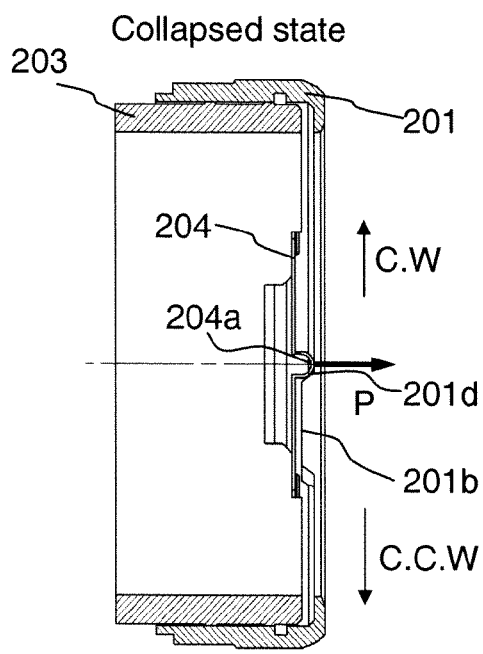
FIGS. 11A, 11B, 11C and 11D are cross-sectional views of the lens barrel of the second exemplary embodiment.
Figure 11B:
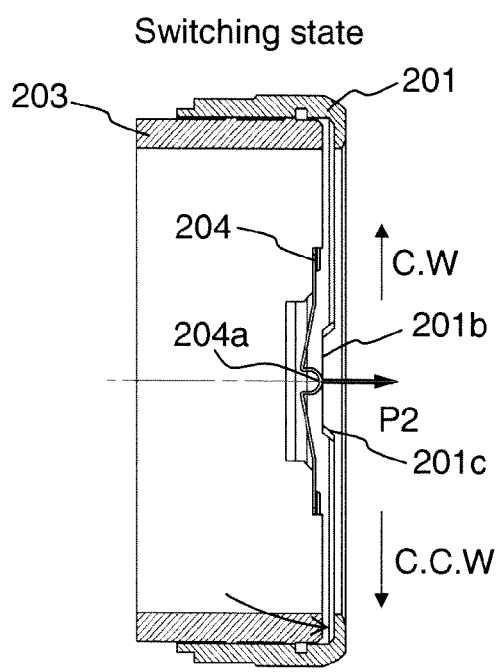
Figure 11C:
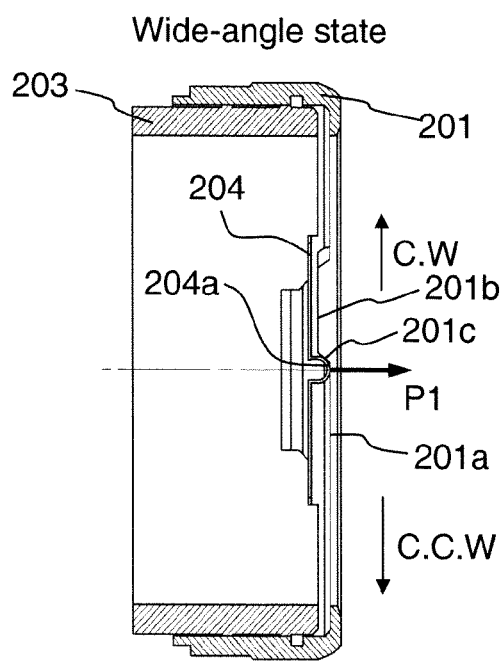
Figure 11D:
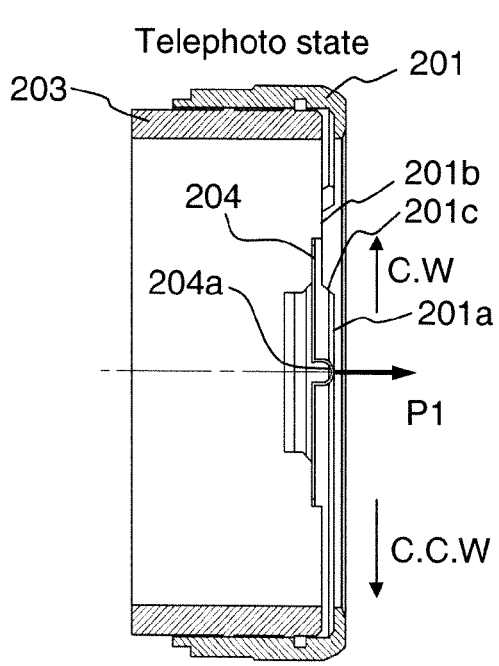

FIG. 11A is a diagram showing the collapsed state. FIG. 11B is a diagram showing the switching state. FIG. 11C is a diagram showing the wide-angle state. FIG. 11D is a diagram showing the telephoto state.

When a user rotates zoom ring 201 in a C.W direction, the collapsed state of FIG. 11A transits to the switching state of FIG. 11B. At this time, curved-surface projection 204a of biasing member 204 moves on from fourth sliding surface 201d to second sliding surface 201b of zoom ring 201. Then, a biasing force with which biasing member 204 presses zoom ring 201 increases from P to P2; thus, in order to rotate zoom ring 201, there is required a rotation torque, in other words, a switching torque which is greater than the increasing biasing force of biasing member 204.

When the user rotates the zoom ring further in the C.W direction and the zooming lens reaches the use state (wide-angle state) of FIG. 11C, the biasing force with which biasing member 204 presses zoom ring 201 decreases from P2 to P1.

When the user rotates the zoom ring further in the C.W direction, the zooming ring reaches the use state (telephoto state) of FIG. 11D. At this time, the biasing force with which biasing member 204 presses zoom ring 201 remains P1.

In the same way as in the first exemplary embodiment, the rotation torque required for operating zoom ring 201 in a range from wide-angle state (FIG. 11C) to telephoto state (FIG. 11D), which are the use state, is smaller than the rotation torque in the switching state.

Further, in order to return from the wide-angle state as the use state to the collapsed state, the switching torque is required in the same way; thus, the user can recognize a border between the use state and the switching state, based on a difference in the rotary operation force of zoom ring 201.

Biasing member 204 is made of a leaf spring which has an arc-like shape along a circumference of the fixed frame; thus, biasing member 204 is configured to be within a thickness of fixed frame 203 in the radius direction. Similarly, a sliding surface of zoom ring 201 is also made not to protrude inside an inner periphery of fixed frame 203; thus, a small-sized lens barrel can be realized which generates the switching torque.

Modified Example of Second Exemplary Embodiment

Figure 12:
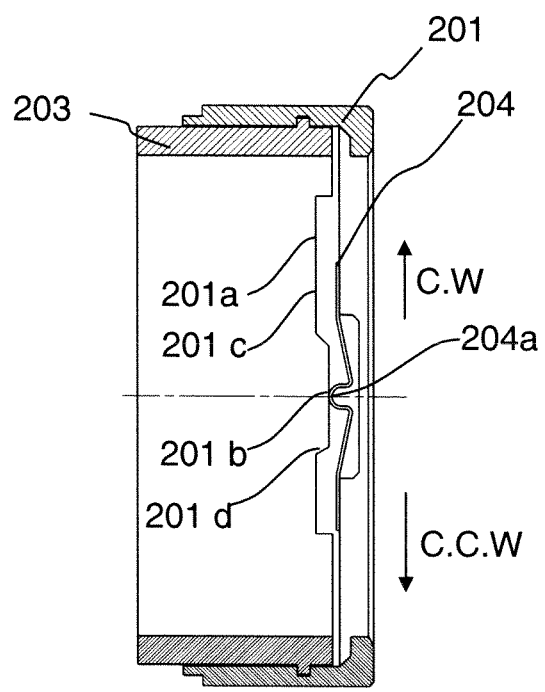
FIG. 12 is a schematic diagram of a cross section of a lens barrel of a modified example of the second exemplary embodiment.

Next, a modified example of the second exemplary embodiment will be described with reference to FIG. 12. Note that, with respect to FIG. 12, the same components as in the second exemplary embodiment are assigned the same reference numerals, and are not described in detail.

In second exemplary embodiment described with reference to FIG. 9A to FIG. 11D, biasing member 204 is held on fixed frame 203, and first sliding surface 201a to fourth sliding surface 201d are disposed on rotatable zoom ring 201. On the other hand, in the modified example of the second exemplary embodiment shown in FIG. 12, biasing member 204 is held on the rotatable zoom ring, and first sliding surface 201a to fourth sliding surface 201d are disposed on fixed frame 203.

The modified example of the second exemplary embodiment can also provide the same advantageous effects as the second exemplary embodiment.

As described above, the exemplary embodiments have been described as examples of the technology in the present disclosure. For this purpose, the attached drawings and the detailed description are provided.

Therefore, the components described in the attached drawings and the detailed description may include, for the sake of exemplifying the above technology, not only components necessary to solve the problems but components unnecessary to solve the problems. For this reason, those unnecessary components should not be recognized to be necessary because those unnecessary components are described in the attached drawings and the detailed description.

In addition, because the above exemplary embodiments are for exemplifying the technology disclosed in the present disclosure, various modification, replacement, addition, and removal can be made within the scope of the appended claims and the equivalent scope.

INDUSTRIAL APPLICABILITY

The present disclosure can be applied to a lens barrel in which a switching torque for switching is required to switch a state from a state in which a lens casing is collapsed to a photographing state. In particular, the present disclosure can be applied to interchangeable lenses for single lens reflex cameras and the like.

What is claimed is:

1. A lens barrel comprising:
a fixed frame which holds a casing;
a ring rotatably held around an outer periphery of the fixed frame;
an action part disposed on the fixed frame and provided between the fixed frame and the ring, along the outer periphery of the fixed frame; and
a biasing member provided between the fixed frame and the ring, along the outer periphery of the fixed frame, the biasing member being fixed to the fixed frame, wherein:
the ring comprises a first action surface to be used at a time of photographing, a second action surface to be used when the casing held by the fixed frame is collapsed into the fixed frame, and a third action surface formed between the first action surface and the second action surface,
the action part is configured to be in contact with and move on the first action surface, the second action surface, and the third action surface,
the biasing member biases the action part toward the outer periphery of the fixed frame,
when the action part moves on the first action surface, a first load is applied to the biasing member,
when the action part moves on the second action surface, a second load greater than the first load is applied to the biasing member, and
when the action part moves on the third action surface, a load which varies from the first load to the second load is applied to the biasing member.

2. A lens barrel comprising:
a fixed frame which holds a casing;
a ring rotatably held around an outer periphery of the fixed frame;
an action part disposed on the fixed frame and provided between the fixed frame and the ring, along the outer periphery of the fixed frame; and
a biasing member provided between the fixed frame and the ring, along the outer periphery of the fixed frame, the biasing member being fixed to the fixed frame, wherein:
the ring comprises a first action surface to be used at a time of photographing, a second action surface to be used when the casing held by the fixed frame is collapsed into the fixed frame, and a third action surface formed between the first action surface and the second action surface,
the action part is configured to be in contact with and move on the first action surface, the second action surface, and the third action surface,
the biasing member biases the action part toward the outer periphery of the fixed frame,
the first action surface is located closer to an outer periphery of the ring than the second action surface is, and
the third action surface connects an end of the first action surface and an end of the second action surface.

3. The lens barrel of claim 1, wherein the action part has a semi-cylindrical contact member which is in line-contact with the second action surface and the third action surface.

4. The lens barrel of claim 2, wherein the action part has a semi-cylindrical contact member which is in line-contact with the second action surface and the third action surface.

5. The lens barrel of claim 3, wherein a length of the second action surface in a first direction along the outer periphery of the ring is longer than a length of the contact member in the first direction.

6. The lens barrel of claim 4, wherein a length of the second action surface in a first direction along the outer periphery of the ring is longer than a length of the contact member in the first direction.

7. The lens barrel of claim 3, wherein the contact member configured to move on the first action surface, the second action surface, and the third action surface is disposed in a first area, and the biasing member is disposed in a second area which is different from the first area.

8. The lens barrel of claim 4, wherein the contact member configured to move on the first action surface, the second action surface, and the third action surface is disposed in a first area, and the biasing member is disposed in a second area which is different from the first area.

9. A lens barrel comprising:
a fixed frame which holds a casing;
a ring rotatably held around an outer periphery of the fixed frame;

an action part provided between the fixed frame and the ring, along the outer periphery of the fixed frame; and
a biasing member provided between the fixed frame and the ring, along the outer periphery of the fixed frame, wherein:
the ring comprises a first action surface to be used at a time of photographing, a second action surface to be used when the casing held by the fixed frame is collapsed into the fixed frame, and a third action surface formed between the first action surface and the second action surface,
the action part is configured to move on the first action surface, the second action surface, and the third action surface,
the biasing member biases the action part toward the outer periphery of the fixed frame,
when the action part moves on the first action surface, a first load is applied to the biasing member,
when the action part moves on the second action surface, a second load greater than the first load is applied to the biasing member,
when the action part moves on the third action surface, a load which varies from the first load to the second load is applied to the biasing member,
the action part has a semi-cylindrical contact member which is in line-contact with the second action surface and the third action surface, and
a length of the second action surface in a first direction along the outer periphery of the ring is longer than a length of the contact member in the first direction.

* * * * *